United States Patent [19]
Nakamura et al.

[11] Patent Number: 6,043,309
[45] Date of Patent: *Mar. 28, 2000

[54] SILICONE RUBBER COMPOSITION FOR USE IN HIGH-VOLTAGE ELECTRICAL INSULATING PARTS AND METHOD FOR MANUFACTURING

[75] Inventors: Akito Nakamura; Yasumichi Shigehisa; Yuichi Tsuji, all of Chiba Prefecture, Japan

[73] Assignee: Dow Corning Toray Silicone Co., Ltd., Tokyo, Japan

[*] Notice: This patent is subject to a terminal disclaimer.

[21] Appl. No.: 09/014,719

[22] Filed: Jan. 28, 1998

[30] Foreign Application Priority Data

Jan. 31, 1997 [JP] Japan ................................. 9-033263

[51] Int. Cl.⁷ ................. C08J 3/24; C08K 3/12; C08K 3/36; C08K 3/20; C08K 3/26; C08K 5/23
[52] U.S. Cl. .............. 524/500; 524/492; 524/437; 524/436; 524/413; 524/106
[58] Field of Search ................... 524/500, 492, 524/437, 436, 413, 106

[56] References Cited

U.S. PATENT DOCUMENTS

| 3,965,065 | 6/1976 | Elliott | 260/37 SB |
|---|---|---|---|
| 5,369,161 | 11/1994 | Kunieda et al. | 524/266 |
| 5,614,881 | 3/1997 | Duggal et al. | 338/22 R |
| 5,691,407 | 11/1997 | Azechi et al. | 524/437 |
| 5,874,164 | 2/1999 | Caldwell | 428/306.6 |
| 5,880,199 | 3/1999 | Matsushita et al. | 524/492 |

FOREIGN PATENT DOCUMENTS 62-26124  6/1987  Japan .

*Primary Examiner*—Vasu Jagannathan
*Assistant Examiner*—Kuo-Liang Peng
*Attorney, Agent, or Firm*—Jennifer S. Warren; William F. Boley

[57] ABSTRACT

A curable liquid silicone rubber composition for use in high-voltage electrical insulating parts, which consists of (A) a polyorganosiloxane containing alkenyl groups, (B) fumed silica, (C) a polyorganohydriodosiloxane, (D) a platinum catalyst, (E) finely powdered aluminum hydroxide, and (F) 1 to 150 parts by weight of a finely powdered metal compound selected from the group consisting of finely powdered carbonate or finely powdered hydrogen salt of a metal selected from the 1st, 2nd, 3rd, 7th, or 9th group of the periodic table.

12 Claims, No Drawings

SILICONE RUBBER COMPOSITION FOR USE IN HIGH-VOLTAGE ELECTRICAL INSULATING PARTS AND METHOD FOR MANUFACTURING

FIELD OF THE INVENTION

The present invention relates to a curable liquid silicone rubber composition. More specifically, the present invention concerns a curable liquid silicone rubber composition which has superior weather resistance and mechanical characteristics, as well as good high-voltage electrical insulating characteristics, including tracking resistance, are resistance and erosion resistance. Examples of possible uses of this composition include anode caps, plug boots, insulators, and flame-retardant electrical wiring.

BACKGROUND OF THE INVENTION

The mixing of large quantities of inorganic fillers such as powdered aluminum hydroxide, powdered aluminum oxide, or powdered quart with silicone rubber compositions for use in applications requiring high-voltage electrical insulating characteristics, such as anode caps, plug boots, insulators, and flame-retardant electrical wiring, has been proposed. For example, Elliott, U.S. Pat. No. 3,965,065, teaches that a silicone rubber composition in which the ordinary electrical insulating characteristics are improved can be obtained by heating a mixture of a heat-curable silicone rubber composition and an aluminum hydrate for 30 minutes or longer at a temperature exceeding 100° C. Furthermore, Hirai, et al., teach in Japanese Patent Application Kokai No. 4-209655 that a mixture consisting of (a) a polyorganosiloxane which forms an elastic material when heat-cured using an organic peroxide, (b) aluminum hydroxide and (c) an organosilane or organosiloxane which has phenyl groups, will form a silicone rubber composition with superior high-voltage electrical insulating characteristics.

The approach of improving electrical properties by the addition of inorganic fillers has several limitations. First, the silicone rubber compositions obtained by a high degree of filling with inorganic fillers such as aluminum hydroxide or aluminum hydrate can have extremely high viscosity. This makes them difficult to use in applications requiring fluidity, such as injection-molding. Moreover, such compositions also have a low mechanical strength. In some instances the high-voltage electrical insulating characteristics of the silicone rubber materials are not adequate. Furthermore, under conditions of harsh contamination or exposure to the elements, deterioration phenomena such as tracking and erosion occur due to high electrical stress, so that the high-voltage electrical insulating characteristics show a conspicuous deterioration.

The object of this invention is to provide a curable liquid silicone rubber composition which has an appropriate degree of fluidity prior to curing, which is superior in terms of moldability, and which forms silicone rubber molded articles that have good high-voltage electrical insulating characteristics and a high mechanical strength following molding.

SUMMARY OF THE INVENTION

This invention is a curable liquid silicone rubber composition for use in high-voltage electrical insulating parts, comprising (A) a polyorganosiloxane containing alkenyl groups, (B) fumed silica, (C) an polyorganohydridosiloxane, (D) a platinum type catalyst, (E) finely powdered aluminum hydroxides, (F) a finely powdered metal compound selected from the group consisting of finely powdered carbonate or finely powdered hydrogen salt of a metal selected from the 1st, 2nd, 3rd, 7th, and 9th groups of the periodic table (long form of the periodic table). Optionally, the curable composition further comprises (G) a triazole compound.

The curable liquid silicone rubber composition provided by the present invention consists of the abovementioned components (A) through (F) or (A) through (G). As a result of containing the abovementioned components (E) and (F), and in some cases the abovementioned component (G), the present composition possesses fluidity prior to curing, is superior in tenns of moldability, and is capable of forming silicone rubber molded products which are superior in terms of high-voltage electrical insulating characteristics and have a high mechanical strength following curing.

DETAILED DESCRIPTION OF THE INVENTION

The invention is a curable liquid silicone rubber composition comprising (A) 100 parts by weight of a polyorganosiloxane containing two or more alkenyl groups bonded to silicon atoms in each molecule, (B) 1 to 60 parts by weight of fumed silica with a specific surface area of 50 $m^2/g$ or greater, (C) a polyorganohydridosiloxane which has at least two hydrogen atoms bonded to silicon atoms in each molecule, wherein the amount of the polyorganohydridosiloxane is an amount such that the ratio of the number of moles of hydrogen atoms bonded to silicon atoms to the number of moles of alkenyl groups bonded to silicon atoms in component (A) is in the range of 0.5:1 to 20:1, (D) a catalytic amount of a platinum catalyst (E) 1 to 150 parts by weight of finely powdered aluminum hydroxide, and (F) 1 to 150 parts by weight of a finely powdered metal compound selected from the group consisting of finely powdered carbonates and finely powdered hydrogen salts of a metal selected from the 1st, 2nd, 3rd, 7th, and 9th group of the periodic table (long form of the periodic table). Optionally, the curable liquid silicone rubber composition may further comprise (G) 0.001 to 1 part by weight of a triazole compound.

The polyorganosiloxane of component (A) is the principal component of the present invention. In order for the present composition to form a silicone rubber which has rubber elasticity following curing, it is necessary that this component have two or more alkenyl groups per molecule. Examples of such alkenyl groups include vinyl groups, allyl groups and propenyl groups. Furthermore, organic groups other than alkenyl groups which may be present in this component include substituted or unsubstituted monovalent hydrocarbon groups, for example, alkyl groups such as methyl, ethyl, propyl, butyl, or octyl; aryl groups such as phenyl or tolyl; and halogenated alkyl groups such as 3,3,3-trifluoropropyl or 3-chloropropyl. The molecular structure of this component is ordinarily linear, but may also be slightly branched. The alkenyl groups in this component may be present on the ends of the molecular chains or on pendant on the chains, or on both the ends of the molecular chains and pendant. These alkenyl groups may consist of a single type of alkenyl group or of a mixture of two or more different types of alkenyl groups. The viscosity of this component is in the range of 100 mPa.s to 100,000 mPa.s, and is preferably in the range of 100 mPa.s to 50,000 mPa.s at 25° C. If the viscosity is too low, the strength of the rubber following curing drops. On the other hand, if the viscosity is too high, the viscosity of the curable liquid silicone rubber composition will be excessively high so that the composition is inferior in terms of fluidity.

Examples of suitable polyorganosiloxanes include polydimethylsiloxanes which are endblocked by vinyldimethylsiloxy groups at both ends, dimethylsiloxane-vinylmethylsiloxane copolymers which are endblocked by vinyldimethylsiloxy groups at both ends, and dimethylsiloxane-methylphenylsiloxane copolymers which are endblocked by vinyldimethylsiloxy groups at both ends.

Polyorganosiloxane resins may also be used as the present component in order to improve the mechanical strength. Examples of such polyorganosiloxane resins include resins consisting of $(CH_3)_3SiO_{1/2}$ units, $(CH_2=CH)SiO_{3/2}$ units and $SiO_{4/2}$ units; resins consisting of $(CH_2=CH)(CH_3)_2SiO_{1/2}$ units and $SiO_{4/2}$ units, and resins consisting of $(CH_2=CH)(CH_3)_2SiO_{1/2}$ units, $(CH_2=CH)(CH_3)_2SiO_{3/2}$ units, and $SiO_{4/2}$ units.

The fumed silica of component (B) is a reinforcing filler, and is used mainly to give the present composition mechanical strength when cured. In order to give the composition mechanical strength, it is necessary that the specific surface area of this fumed silica be 50 $m^2/g$ or greater. The amount of component (B) that is added is 1 to 60 parts by weight, and preferably 10 to 40 parts by weight, per 100 parts by weight of component (A). If the amount of component (B) added is too small, a high mechanical strength cannot be obtained; conversely, if the amount added is excessively large, the fluidity that is a characteristic of curable liquid silicone rubbers will be lost. Furthermore, fumed silica with a specific surface area of 100 $m^2/g$ or greater which has been surface-treated with an organosilicon compound selected from the group consisting of organosilanes, organosilazanes, organosiloxane oligomers, and mixtures of these compounds improves the mechanical strength and is therefore desirable.

The polyorganohydridosiloxane of component (C) acts as a cross-linking agent in the present composition. Specifically, in the presence of the platinum catalyst of component (D), the hydrogen atoms bonded to silicon atoms in component (C) undergo an addition reaction with tie alkenyl groups bonded to silicon atoms in component (A). As a result, the present composition is cross-linked and cured. It is necessary that the polyorganosiloxane of component (C) have at least two hydrogen atoms bonded to silicon atoms in each molecule. Organic groups other than these hydrogen atoms bonded to silicon atoms which may be present in this component include alkyl groups such as methyl, ethyl or propyl; aryl groups such as phenyl or tolyl; and substituted alkyl groups such as 3,3,3-trifluoropropyl or 3-chloropropy.

The molecular structure of component (C) may be linear, linear including branching, cyclic, or network-form. There are no particular restrictions on the molecular weight of component (C), however it is preferable that the viscosity at 25° C. be 3 to 10,000 mPa.s. Furthermore, the amount of component (C) that is added to the composition is an amount such that the ratio of the number of moles of hydrogen atoms bonded to silicon atoms to the number of moles of alkenyl groups bonded to silicon atoms is in the range of 0.5:1 to 20:1, and preferably in the range of 1:1 to 1:3. If this molar ratio is less than 0.5, curing of the present composition becomes insufficient, while if this molar ratio exceeds 20 hydrogen gas is evolved so that foaming occurs.

The platinum catalyst of component (D) is a catalyst which is used to cure the present composition. Examples of such platinum catalysts include chloroplatinic acid, alcohol solutions of chloroplatinic acid, complexes of chloroplatinic acid with olefins, complexes of chloroplatinic acid with divinylsiloxane, platinum black, metallic platinum, and catalysts in which metallic platinum is supported on a support. The amount of component (D) that is added varies according to the type of platinum catalyst that is used, and is not especially restricted; ordinarily, however, the amount added is 1 to 1,000 parts by weight, preferably 5 to 100 parts by weight, per 1,000,000 parts by weight of component (A).

The finely powdered aluminum hydroxide of component (E) has been confirmed previously as having an effect in improving high-voltage electrical insulating characteristics and is an essential component of the present invention. This component consists of particles which normally have diameters within the range of 0.2 to 100 $\mu$m. The amount of component (E) that is added is in the range of 1 to 150 parts by weight per 100 parts by weight of component (A). If the amount of component (E) added is less than 1 part by weight, sufficient high-voltage electrical insulating characteristics cannot be obtained. On the other hand, if the amount of component (E) added exceeds 150 parts by weights there is a danger that the mechanical strength of the material will drop. Furthermore, at amounts of component (E) over 150 parts by weight, the viscosity of the present composition becomes excessively high so that the fluidity which is a characteristic of curable liquid silicone rubbers is lost.

A distinguishing feature of the present invention is a component (F) which is represented by a finely powdered carbonate or finely powdered hydrogen salt of a metal. By using component (F) in combination with component (D), it is possible to achieve a great improvement in the high-voltage electrical insulating characteristics of the present composition. More specifically, component (F) is a finely powdered carbonate or finely powdered hydrogen salt of a metal selected from the 1st, 2nd, 3rd, 7th, and 9th groups of the periodic table. An example of the periodic table of the elements is illustrated in Vol. 2 of Chemical Handbook issued by Marubeni Publishers on Mar. 15, 1995. Component (F) may be represented by a finely powdered carbonate or finely powdered hydrogen salt of a metal and may be selected from the following group of compounds: potassium carbonate, potassium sodium carbonate, calcium carbonate, cobalt carbonate, potassium hydrogen carbonate, sodium hydrogen carbonate, strontium carbonate, cerium carbonate, sodium carbonate, nickel carbonate, barium carbonate, magnesium carbonate, manganese carbonate, and lithium carbonate. The amount of this component that is added is in the range of 1 to 150 parts by weight, preferably 10 to 100 parts by weight, per 100 parts by weight of component (A).

The triazole compound of component (G) causes a further improvement in the high-voltage insulating characteristics of the present composition when used in combination with the aforementioned components (D) and (E). This is a surprise in light of the fact that component (G) shows no significant effect when used alone. Examples of such triazole compounds include benzotriazole, 1,2,3-triazole, 1,2,4-triazole, and derivatives of these triazoles. Component (G) has a high melting point making it a solid at mixing temperatures of this process. Accordingly, component (G) may also be dissolved in an organic solvent such as ethanol, isopropyl alcohol, benzene, toluene, or xylene in order to achieve uniform dispersion in the silicone rubber composition. The amount of component (G) that is added is in the range of 0.001 to 1 part by weight per 100 part by weight of component (A). If the amount of component (G) added is less than 0.001 parts by weight, the combined use of this component has no effect. On the other hand, if the amount of component (G) added exceeds 1 part by weight, curing tends to be hindered; furthermore, the addition of a larger amount shows no corresponding improvement in the effect.

The present composition can easily be manufactured by uniformly mixing prescribed amounts of the abovementioned components (A) through (F) or (A) through (G). Here, there are no particular restrictions on the order in which components (A) through (F) or (A) through (G) are added; however, it is preferable to prepare a silicone rubber base compound by heating and mixing components (A), (B), (E) and (F) under reduced pressure and then cooling the resulting mixture, and then add and mix components (C) and (D), and, optionally, component (G).

If necessary, conventional addition reaction inhibiting agents such as ethynylcyclohexanol, dimethylformamide, triphenylphosphine, cyclic vinylmethylsiloxane, 3-methyl-1-butyn-3-ol, 3,5-dimethyl-1-hexan-3-ol, cyclohexylbutynol, 3-phenyl-1-butyn-3-ol, diphenylethylcarbinol or 3,5-dimethyl-3-hexen-1-yne, may also be added to the present composition. Furthermore, as long as there is no interference with the object of the present invention, universally known reinforcing fillers, quasi-reinforcing fillers, non-reinforcing fillers, flame-retarding agents, heat-resistant agents and adhesion enhancing agents, may be added to the present composition if necessary.

EXAMPLES

In these examples, all parts are parts by weight and all viscosity values for the polyorganosiloxanes are values measured at 25° C. Measurement of the physical properties of the silicone rubber molded articles obtained was accomplished using the measurement methods stipulated in JIS K6301. Furthermore, in regard to the high-voltage electrical insulating characteristics, a tracking resistance test using the inclined flat plate method was performed using a HAT-520 (manufactured by Hitachi Kasei Kogyo) in accordance with the procedure described in IEC Publ. 587 (test voltage: 3.5 kV). Determination A and Determination B shown in the tables refer to the following values: the former value is the time, in minutes, required for the current flowing through a high-voltage circuit via the test sample to exceed 60 mA, while the latter value is the time, in minutes, required for tracking to reach a mark formed on the surface of the test sample in a position 25 mm from the lower electrode. Furthermore, erosion was observed visually, and was evaluated according to five grades: slight, minor, moderate, major, and deep.

Practical Example 1

20 Parts of fumed silica with a specific surface area of 200 m$^2$/g, 50 parts of finely powdered aluminum hydroxide, with an average particle size of 1 μm, 15 parts of finely powdered cerium carbonate, 3 parts of hexamethyldisilazane (used as a surface treatment agent for the fumed silica), and 1 part of water were mixed with 100 parts of a polydimethylsiloxane which was endblocked by vinyldimethylsiloxy groups at both ends of the molecular chains and which had a viscosity of 10,000 mPa.s (content of vinyl groups bonded to silicon atoms: 0.14 wt %), until a uniform mixture was obtained. This mixture was further heat-treated for 2 hours at 170° C. in a vacuum. Afterward, 1.4 parts of a dimethylsiloxane-hydridomethylsiloxane copolymer endblocked by trimethylsiloxy groups at both ends of the molecular chains (content of hydrogen atoms bonded to silicon atoms: 0.7 wt %) and 10 ppm chloroplatinic acid (calculated as the amount of platinum metal) used as a catalyst were added and uniformly mixed, thus producing a curable liquid silicone rubber composition. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 1.

Practical Example 2

0.3 Parts of a 30 wt % isopropyl alcohol solution of benzotriazole was further added to 100 parts of the curable liquid silicone rubber composition 1 obtained in Practical Example 1, and these ingredients were uniformly mixed, thus producing a curable liquid silicone rubber composition. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 1.

Comparative Example 1

A curable liquid silicone rubber composition was obtained in the same manner as in Practical Example 1, except that the amount of finely powdered aluminum hydroxide added was set at 65 parts, and no finely powdered cerium carbonate was added. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 1.

Comparative Example 2

A curable liquid silicone rubber composition was obtained in the same manner as in Practical Example 1, except that the amount of finely powdered cerium carbonate added was set at 65 parts, and no finely powdered aluminum hydroxide was added. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured The results of these measurements are shown in Table 1.

TABLE 1

| (parts) | Pr. Ex. 1 | Pr. Ex. 2 | Comp. Ex. 1 | Comp. Ex. 2 |
| --- | --- | --- | --- | --- |
| Polydimethylsiloxane | 100 | 100 | 100 | 100 |
| Fumed silica | 20 | 20 | 20 | 20 |
| Finely powdered aluminum hydroxide | 50 | 50 | 65 | — |
| Finely powdered cerium carbonate | 15 | 15 | — | 65 |
| Hexamethyldisilazane | 3 | 3 | 3 | 3 |
| Water | 1 | 1 | 1 | 1 |
| Dimethylsiloxane-hydridomethylsiloxane copolymer | 1.4 | 1.4 | 1.4 | 1.4 |
| Chloroplatinic acid (ppm calculated as amount of platinum metal) | 10 | 10 | 10 | 10 |
| 30% IPA solution of benzotriazole | — | 0.3 | — | — |
| Viscosity of composition (mPa · s) | 180000 | 180000 | 250000 | 150000 |

TABLE 1-continued

| (parts) | Pr. Ex. 1 | Pr. Ex. 2 | Comp. Ex. 1 | Comp. Ex. 2 |
|---|---|---|---|---|
| Physical characteristics | | | | |
| Hardness (JIS-A) | 40 | 40 | 40 | 40 |
| Tensile strength (kgf/cm$^2$) | 40 | 40 | 45 | 25 |
| Elongation (%) | 400 | 450 | 500 | 200 |
| Tensile rupture strength (A) (kgf/cm) | 14 | 15 | 11 | 6 |
| High-voltage electrical insulating characteristics (Tracking resistance) | | | | |
| Determination A (min) | more than 360 | more than 360 | 90 | 120 |
| Determination B (min) | 210 | more than 360 | 70 | 110 |
| Erosion | Moderate | Slight | Major | Deep |

Practical Example 3

20 parts of fumed silica with a specific surface area of 200 m$^2$/g, 50 parts of finely powdered aluminum hydroxide; 15 parts of finely powdered cerium carbonate; and 3 parts of a dimethylsiloxane oligomer endblocked by dimethylhydroxysiloxy groups at both ends (used as a surface treatment agent for the fumed silica) were mixed with 100 parts of a polydimethylsiloxane which was endblocked by vinyldimethylsiloxy groups at both ends of the molecular chains and which had a viscosity of 10,000 mPa.s, with 0.14 wt % of vinyl groups bonded to silicon atoms, until a uniform mixture was obtained. This mixture was further heat-treated for 2 hours at 170° C. in a vacuum. Afterward, 1.4 parts of a dimethylsiloxane-hydridomethylsiloxane copolymer endblocked by trimethylsiloxy groups at both ends of the molecular chains, with 0.7 wt % of hydrogen atoms bonded to silicon atoms; and 10 ppm chloroplatinic acid (calculated as the amount of platinum metal) used as a catalyst were added and uniformly mixed, thus producing a curable liquid silicone rubber composition. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured, The results of these measurements are shown in Table 2.

Practical Example 4

20 Parts of formed silica with a specific surface area of 110 m$^2$/g which had been surface-treated with dimethyldichlorosilane, 50 parts of finely powdered aluminum hydroxide and 15 parts of finely powdered cerium carbonate were mixed with 100 parts of a polydimethylsiloxane which was endblocked by vinyldimethylsiloxy groups at both ends of the molecular chains and which had a viscosity of 10,000 mPa.s, with 0.14 wt. % of vinyl groups bonded to silicon atoms, until a uniform mixture was obtained. This mixture was further heat-treated for 2 hours at 170° C. in a vacuum. Afterward, 1.4 parts of a dimethylsiloxane-hydridomethylsiloxane copolymer endblocked by trimethylsiloxy groups at both ends of the molecular chains with 0.7 wt % of hydrogen atoms bonded to silicon atoms and 10 ppm chloroplatinic acid (calculated as the amount of platinum metal) used as a catalyst were added and uniformly mixed, thus producing a curable liquid silicone rubber composition. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 2.

TABLE 2

| (parts) | Pr. Ex. 3 | Pr. Ex. 4 |
|---|---|---|
| Polydimethylsiloxane | 100 | 100 |
| Fumed silica | 20 | — |
| Surface-treated fumed silica | — | 20 |
| Finely powdered aluminum hydroxide | 50 | 50 |
| Finely powdered cerium carbonate | 15 | 15 |
| Dimethylsiloxane oligomer | 3 | — |
| Dimethylsiloxane-hydridomethyl-siloxane copolymer | 1.4 | 1.4 |
| Chloroplatinic acid (ppm calculated as amount of platinum metal) | 10 | 10 |
| Viscosity of composition (mPa · s) | 250000 | 300000 |
| Physical Characteristics | | |
| Hardness (JIS-A) | 40 | 40 |
| Tensile strength (kgf/cm$^2$) | 40 | 40 |
| Elongation (%) | 400 | 450 |
| Tensile rupture strength (A) (kgf/cm) | 14 | 14 |
| High-voltage electrical insulating characteristics (Tracking resistance) | | |
| Determination A (min) | more than 360 | more than 360 |
| Determination B (min) | 210 | 210 |
| Erosion | Moderate | Moderate |

Practical Example 5

A curable liquid silicone rubber composition was obtained in the same manner as in Practical Example 1, except that finely powdered barium carbonate was added instead of the finely powdered cerium carbonate used in Practical Example 1. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 3.

Practical Example 6

A curable liquid silicone rubber composition was obtained by further adding 0.3 parts of a 30 wt % isopropyl alcohol solution of benzotriazole to 100 parts of the curable liquid silicone rubber composition obtained in Practical Example 5. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 3.

Comparative Example 3

A curable liquid silicone further composition was obtained in the same manner as in Practical Example 1, except that the amount of finely powdered barium carbonate added was set at 65 parts and no finely powdered aluminum hydroxide was added. This curable liquid silicone rubber composition was cured by heating for 5 minutes at 150° C., thus producing a sheet-form silicone rubber molded product.

The physical characteristics and high-voltage electrical insulating characteristics of this silicone rubber molded product were measured. The results of these measurements are shown in Table 3.

TABLE 3

| (parts) | Pr. Ex. 5 | Pr. Ex. 6 | Comp. Ex. 3 |
|---|---|---|---|
| Finely powdered aluminum hydroxide | 50 | 50 | — |
| Finely powdered barium carbonate | 15 | 15 | 65 |
| 30% IPA solution of benzotriazole | — | 0.3 | — |
| Viscosty of composition (mPa · s) | 200000 | 200000 | 350000 |
| Physical characteristics | | | |
| Hardness (JIS-A) | 40 | 40 | 40 |
| Tensile strength (kgf/cm$^2$) | 50 | 50 | 50 |
| Elongation (%) | 550 | 600 | 550 |
| Tensile rupture strength (A) (kgf/cm) | 15 | 15 | 16 |
| High-voltage electrical inulating characteristics (Tracking resistace) | | | |
| Determination A (min) | more than 360 | more than 360 | 80 |
| Determination B (min) | 240 | more than 360 | 70 |
| Erosion | Moderate | Minor | Major |

Practical Example 7

A curable liquid silicone rubber composition was obtained in the same manner as in Practical Example 1, except that finely powdered cerium carbonate was replaced by the finely powdered potassium used in Practical Example 1. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 4.

Practical Example 8

A curable liquid silicone rubber composition was obtained by further adding 0.3 parts of a 30 wt % isopropyl alcohol solution of benzotriazole to 100 parts of the curable liquid silicone rubber composition obtained in Practical Example 7. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 4.

Comparative Example 4

A curable liquid silicone rubber composition was obtained in the same manner as in Practical Example 7, except that the amount of finely powdered calcium carbonate added was set at 65 parts and no finely powdered aluminum hydroxide was added.

This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 4.

TABLE 4

| (parts) | Pr. Ex. 7 | Pr. Ex. 8 | Comp. Ex. 4 |
|---|---|---|---|
| Finely powdered aluminum hydroxide | 50 | 50 | — |
| Finely powdered calcium carbonate | 15 | 15 | 65 |
| 30% IPA solution of benzotriazole | — | 0.3 | — |
| Viscosity of composition (mpa · s) | 150000 | 150000 | 180000 |
| Physical characteristics | | | |
| Hardness (JIS-A) | 40 | 40 | 40 |
| Tensile strength (kgf/cm$^2$) | 50 | 50 | 55 |
| Elongation (%) | 500 | 550 | 550 |
| Tensile rupture strength (A) (kgf/cm) | 15 | 15 | 13 |
| High-voltage electrical insulating characteristics (Tracking resistance) | | | |
| Determination A (min) | more than 360 | more than 360 | 80 |
| Determination B (min) | 240 | more than 360 | 70 |
| Erosion | Moderate | Minor | Major |

Practical Example 9

A curable liquid silicone rubber composition was obtained in the same manner as in Practical Example 1, except that the finely powdered cerium carbonate was replaced by finely powdered magnesium carbonate. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 5.

Comparative Example 5

A curable liquid silicone rubber composition was obtained in the same manner as in Practical Example 9, except that the finely powdered magnesium carbonate was used in an amount of 65 parts and the finely powdered aluminum hydroxide was not added. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 5.

TABLE 5

| (parts) | Pr. Ex. 9 | Pr. Ex. 10 | Comp. Ex. 5 |
|---|---|---|---|
| Finely powdered aluminum hydroxide | 50 | 50 | — |
| Finely powdered magnesium carbonate | 15 | 15 | 65 |
| 30% IPA solution of benzotriazole | — | 0.3 | — |
| Viscosity of composition (mPa · s) | 150000 | 150000 | 180000 |
| Physical characteristics | | | |
| Hardness (JIS-A) | 40 | 40 | 40 |
| Tensile strength (kgf/cm$^2$) | 50 | 50 | 50 |
| Elongation (%) | 500 | 550 | 550 |
| Tensile rupture strength (A) (kgf/cm) | i5 | 15 | 12 |
| High-voltage electrical insulating characteristics (Tracking resistance) | | | |
| Determination A (min) | more than 360 | more than 360 | 40 |

TABLE 5-continued

| (parts) | Pr. Ex. 9 | Pr. Ex. 10 | Comp. Ex. 5 |
|---|---|---|---|
| Determination B (min) | 340 | more than 360 | 70 |
| Erosion | Moderate | Minor | Major |

Practical Example 11

A curable liquid silicone rubber composition was obtained in the same manner as in Practical Example 1, except that the finely powdered sodium hydrocarbonate was used instead of the finely powdered cerium carbonate. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 6.

Practical Example 12

A curable liquid silicone rubber composition was obtained by combining and uniformly mixing 100 parts of the liquid silicone rubber composition obtained in Practical Example 11 with 0.3 parts of a 30 wt. % isopropyl alcohol solution of benzotriazole. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 6.

Comparative Example 6

A curable liquid silicone rubber composition was obtained in the same manner as in Practical Example 11, except that the finely powdered sodium hydrocarbonate was used in an amount of 65 parts and that the finely powdered aluminum hydroxide was not added. This curable liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 6.

TABLE 6

| (parts) | Pr. Ex. 11 | Pr. Ex. 12 | Comp. Ex. 6 |
|---|---|---|---|
| Finely powdered aluminum hydroxide | 50 | 50 | — |
| Finely powdered sodium hydrocarbonate | 15 | 15 | 65 |
| 30% IPA solution of benzotriazole | — | 0.3 | — |
| Viscosity of composition (mPa · s) | 150000 | 150000 | 130000 |
| Physical characteristics | | | |
| Hardness (JIS-A) | 40 | 40 | 40 |
| Tensile strength (kgf/cm²) | 50 | 50 | 25 |
| Elongation (%) | 300 | 350 | 200 |
| Tensile rupture strength (A) (kgf/cm) | 13 | 14 | 6 |
| High-voltage electrical insulating characteristics | | | |
| (Tracking resistance) | | | |
| Determination A (min) | miore than 360 | more than 360 | 40 |
| Determination B (min) | 180 | more than 360 | 70 |
| Erosion | Moderate | Minor | Major |

We claim:

1. A curable silicone rubber composition for use in high-voltage electrical insulating parts, comprising:
    (A) 100 parts by weight of a polyorganosiloxane containing two or more alkenyl groups bonded to silicon atoms in each molecule,
    (B) 1 to 60 parts by weight of formed silica with a specific surface area of 50 m²/g or greater,
    (C) a polyorganohydridosiloxane which has at least two hydrogen atoms bonded to silicon atoms in each molecule, wherein the amount of this component is an amount which is such that the ratio of the number of moles of hydrogen atoms bonded to silicon atoms in the polyorganohydridosiloxane to the number of moles of alkenyl groups bonded to silicon atoms in component (A) is in the range of 0.5:1 to 20:1,
    (D) a catalytic amount of a platinum catalyst,
    (E) 1 to 150 parts by weight of finely powdered aluminum hydroxide, and
    (F) 1 to 150 parts by weight of a finely powdered metal compound selected from the group consisting of carbonates and hydrogen salts of a metal selected from the 1st, 2nd, 3rd, 7th, and 9th group of the periodic table.

2. The composition of claim 1, further comprising component (G) 0.001 to 1 part by weight of a triazole compound.

3. The composition of claim 1 where the polyorganosiloxane has a viscosity of 100 mPa.s to 50,000 mPa.s at 25° C.

4. The composition of claim 1 where the silica is added at 10 to 40 parts by weight.

5. The composition of claim 1 where the polyorganohydridosiloxane has a viscosity of 3 to 10,000 mPa.s at 25° C.

6. The composition of claim 1 wherein the polyorganohydridosiloxane is added such that the ratio of the number of moles of hydrogen atoms bonded to silicon atoms in the polyorganohydridosiloxane to the number of moles of alkenyl groups bonded to silicon atoms in component (A) is in the range of 1:1 to 1:3.

7. The composition of claim 1 wherein component (D) is added at 5 to 100 parts per million parts of component (A).

8. The composition of claim 1 wherein component (F) is added at 10 to 100 parts by weight per 100 parts by weight of component (A).

9. The composition of claim 1 wherein component (F) is selected from the group consisting of potassium carbonate, potassium sodium carbonate, calcium carbonate, cobalt carbonate, potassium hydrogen carbonate, sodium hydrogen carbonate, strontium carbonate, cerium carbonate, sodium carbonate, nickel carbonate, barium carbonate, magnesium carbonate, manganese carbonate, and lithium carbonate.

10. The composition of claim 2 wherein component (G) is selected from the group consisting of benzotriazole, 1,2,3-triazole, 1,2,4-triazole and derivatives of these triazoles.

11. A method for manufacturing a curable curable liquid silicone rubber composition for use in high-voltage electrical insulating parts comprising forming by mixing a silicone rubber base comprising
- (A) 100 parts by weight of an polyorganosiloxane containing two or more alkenyl groups bonded to silicon atoms in each molecule,
- (B) 1 to 60 parts by weight of fumed silica with a specific surface area of 50 m²/g or greater,
- (E) 1 to 150 parts by weight of finely powdered aluminum hydroxide, and (F) 1 to 150 parts by weight of a finely powdered metal compound selected from the group consisting of finely powdered carbonate or finely powdered hydrogen salt of a metal selected from the 1st, 2nd, 3rd, 7th, or 9th group of the periodic table, then adding and mixing into the silicone rubber base
- (C) a polyorganohydridosiloxane which has at least two hydrogen atoms bonded to silicon atoms in each molecule, where the amount of this component is an amount which is such that the ratio of the number of moles of hydrogen atoms bonded to silicon atoms to the number of moles of alkenyl groups bonded to silicon atoms in component (A) is in the range of 0.5:1 to 20:1, and
- (D) a catalytic amount of a platinum catalyst.

12. The method of claim 11, further comprising adding (G) 0.001 to 1 part by weight of a triazole compound is added to the silicone rubber base.

* * * * *